June 23, 1970  L. G. SCHOWALTER  3,516,498
ELECTRO DRAFT CONTROL MECHANISM
Filed March 7, 1968
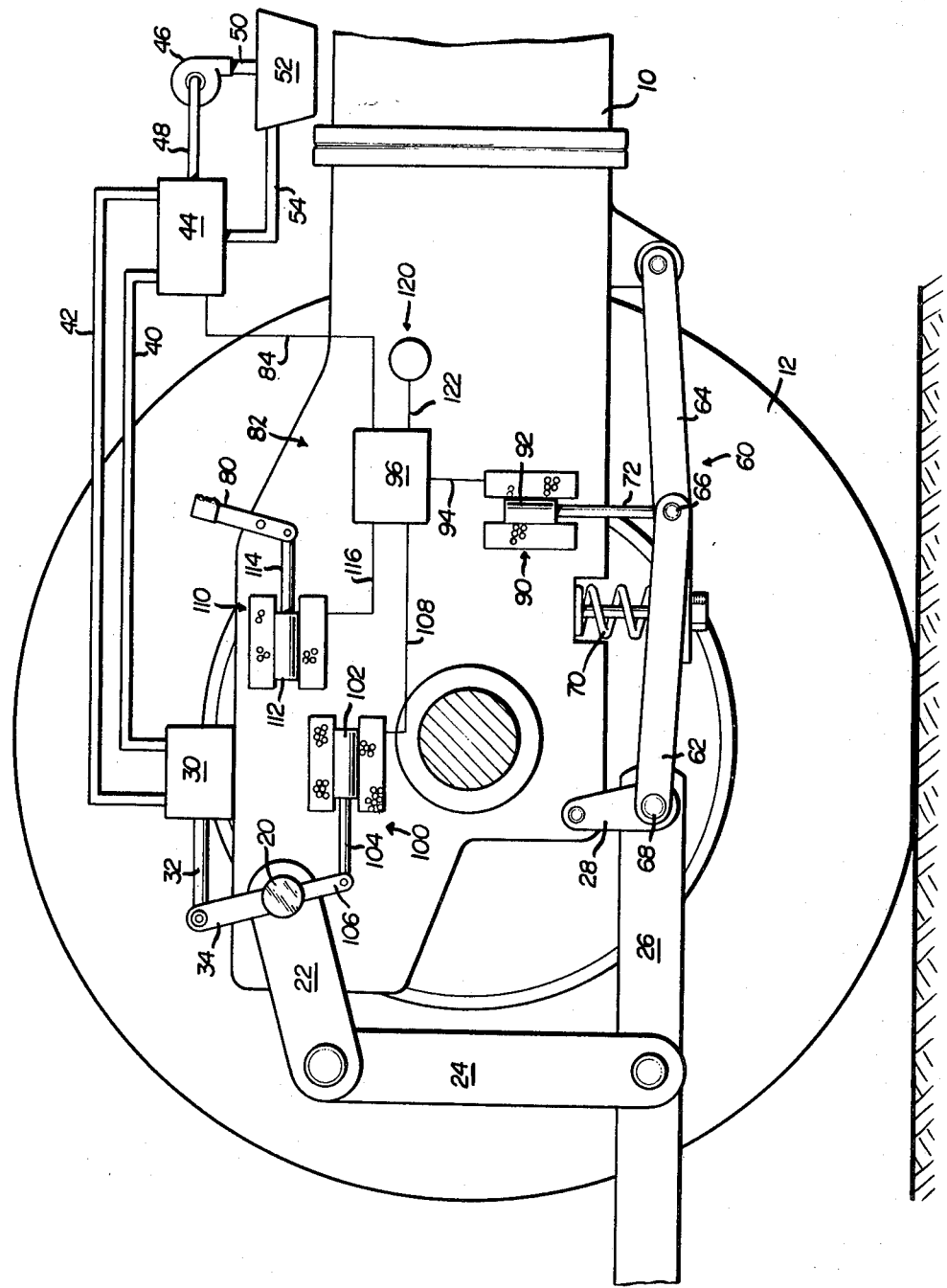
INVENTOR.
LEWIS G. SCHOWALTER.
BY
SETTLE, BATCHELDER & OLTMAN.
ATT'YS.

United States Patent Office 3,516,498
Patented June 23, 1970

3,516,498
ELECTRO DRAFT CONTROL MECHANISM
Lewis G. Schowalter, Racine, Wis., assignor to J. I. Case Company, Racine, Wis., a corporation of Wisconsin
Filed Mar. 7, 1968, Ser. No. 711,444
Int. Cl. A01b 63/112, 63/114
U.S. Cl. 172—9                                                     9 Claims

ABSTRACT OF THE DISCLOSURE

A draft control system including a draft sensing mechanism for controlling the magnitude of draft exerted upon a tractor-drawn implement as well as a positioning mechanism for positioning the implement with respect to the tractor. The sensing and/or positioning mechanisms include electrical apparatus for producing a signal which in turn is compared with a reference signal and a single resultant output signal is produced which actuates an electrically operated valve to reposition the implement with respect to the tractor and/or maintain a predetermined draft load on the implement.

BACKGROUND OF THE INVENTION

The present invention relates generally to a draft control system for a tractor drawn implement and more particularly to an improved system for automatic position control and/or draft control between an implement and a tractor.

In tractors having hitches of the draft control type, it is conventional to provide a hydraulic lift for positioning the implement hitch which usually comprises a pair of draft links connecting the implement to the tractor. Fluid is selectively admitted to the hydraulic lift by a valve which is actuated in response to changes in position of the hitch linkage, the manual positional setting of the hitch linkage and the changes in draft forces on the hitch linkage.

While many control systems have been produced for position of the hitch linkage with respect to the tractor, as well as changing the position of the hitch linkage in response to changes in draft load thereon or a combination of both position and draft control, all of the more recent devices have been very complicated in construction requiring very close tolerances in producing the various elements of the system. Furthermore, these systems have been very expensive to maintain in an operative condition.

SUMMARY OF THE INVENTION

The present invention provides a simple and efficient control mechanism for actuating a control valve operating a hydraulic motor which raises or lowers the hitch linkage on the tractor. The present invention includes producing signals which are a function of the changes in draft load on the implement hitch, the position of the implement hitch, or the desired setting of the implement hitch and comparing two or more of the signals to produce a single output signal for actuating the valve which is the combined function of the various input signals. In the illustrated embodiment, a first signal is produced as a function of the desired positional setting of the manual control member normally associated with such a system, a second signal which is a function of the positional setting of the hitch linkage with respect to the tractor and a third signal which is a function of the changes in draft load on the implement hitch. All of these signals are integrated to produce a single output signal that actuates a control valve to raise or lower the implement hitch with respect to the tractor.

Thus, the primary object of the present invention is to provide a draft control system which requires a minimum number of parts.

Another object is to provide an electrohydraulic draft control system in which an electrical circuit interconnects the various variables of the system and produces a single output signal which actuates a control valve in response to changes of the system.

Other objects of this invention will appear in the following description and appended claims reference being had to the accompanying drawings forming a part of this specification wherein like reference characters designate corresponding parts in the several views.

BRIEF DESCRIPTION OF DRAWING

The single figure of the drawing discloses a schematic illustration of the draft control system of the invention with various elements of a tractor and implement hitch.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Referring particularly to the single view of the drawing, the invention is illustratively shown as embodied within a conventional tractor having a housing 10 supported on wheels 12 (only one of which is shown). A rock shaft 20 is supported for rotational movement within the tractor housing 10 and has a rock arm 22 secured thereto for rotation therewith. The rock arm 22 is connected through a link 24 to a draft arm or link 26 pivoted by a link 28 to the tractor housing. It is to be understood that while one of the various links are shown the conventional tractor includes two of the links and arms on opposite sides of the tractor.

The rock shaft 20 is adapted to be rotated in either direction by hydraulic power means in the form of a fluid motor 30 having its piston rod 32 connected to a link 34 fixedly secured to the rock shaft 20. Thus admission of fluid to either end of the fluid motor 30 will raise or lower the draft arms 26 with respect to the housing 10 and, with no fluid being supplied, the fluid motor will support the draft arms.

Pressured fluid may be admitted to either end of the fluid motor or actuator 30 through a pair of conduits 40 and 42 connected to a control valve 44. Pressured fluid is generally supplied to the control valve by a pump 46 connected through a conduit 48 to the control valve and by fluid conduit 50 to a fluid supply 52. Likewise, the control valve 44 has a drain conduit 54 to return excess fluid supplied by the pump or return from the fluid actuator 30 to the fluid supply 52.

An implement (not shown) is conventionally attached to the free ends of the draft arms and produces a draft load upon the arms which will be determined by the type of implement as well as the depth of the implement in the ground. In a conventional draft control system, some sensing means are provided for detecting any changes in draft force applied by the implement to the draft arms 26 or hitch linkage. In the illustrated embodiment, a draft sensing means 60 in the form of a pair of toggle links 62, 64 are pivotally interconnected by a floating pin and have their opposite ends respectively connected to housing 10 and a cross shaft 68 supporting the hitch linkage 26. A compression spring 70 is interposed between the linkage and the tractor housing to shift the linkage to a first predetermined position. Also, a follower rod 72 is connected to the pivot pin 66 to indicate any changes in the position of the pin 66 as a function of changes in draft load on the implement. The specific sensing mecahnism is not necessary for the practice of the present invention and is embodied in a separate copending application Ser. No. 711,417, attorney's File No. 6218, and assigned to the assignee of the present application. In fact many types of sensing mecahnisms may be utilized with the control system of the present invention, such as the sensing mechanism disclosed in copending application Ser. No. 424,-004 filed Jan. 1, 1965 and Pat. No. 3,342,274 dated Sept. 19, 1967, both assigned to the assignee of the present application.

According to the present invention, electric means are provided for actuating the control valve in response to changes in draft load, changes in position of the rockshaft 20 and changes in the setting of the conventional control lever 80 normally associated with such a system. In the illustrated embodiment, the control valve 44 is of the servo actuated type in which a valve elemnt (not shown) is moved in opposite directions from a neutral position in response to signals received from a control circuit 82. The control circuit produces an output signal through line 84 which is a combined function of several input signals, which will be presently described.

According to one aspect of the invention, electric means are operatively associated with the follower or control rod 72 connected to the draft sensing mecahnism 60 so as to produce an electrical signal which is a function of both the rate and amount of movement of the floating pin or lever 66. In the illustrated embodiment, the electric means includes a variable output transformer 90 having an axially movable core 92 connected to the follower rod 72. Since the variable transformer 90 is of the conventional type, no detailed description thereof appears to be necessary. Suffice it to say that axial movement of the core 90 within the magnetic field of the transformer winding will produce a signal through line 94 which is a function of both the magnitude and speed of movement of the follower rod 72. The signal through line 94 is received by a control mechanism 96 forming part of the control circuit 82, as will become apparent hereinafter.

Likewise, a second variable transformer 100 has an axially movable core 102 connected by rod 104 to a fixed arm 106 carried by the rotatable rock shaft 20. The variable transformer 100 again produces an electrical signal through line 108 to the electrical control mechanism 96 as a function of the rotation of rockshaft 20.

Also, a variable transformer 110 has a core 112 thereof connected through rod 114 to the manual control lever 80 and produces an electrical signal through line 116 to the control mecahnism 96. An electrical source 120 is connected through line 122 to the electrical control mechanism 96. The electric source 120 may be a conventional 12 volt DC source which conventionally supplies the electrical power required for operation of the tractor.

The three signals received by the control mechanism are compared and a single resutlant output signal is produced which is a function of the respective input signal and will change in response to changes of anyone of the three input signals.

The electrical control mechanism may take many forms. Thus, by way of example and not of limitation, the control mechanism 96 may be in the form of a demodulator, an inverter and an impedance bridge in which the three variable transformers are connected to three branches of the impedance bridge, while the neutral branch of the impedance bridge is connected to the servo or voice coil which actuates the control valve 44. The DC voltage source received through line 122 by the impedance bridge may be converted to an AC signal within control circuit 96 and the various signals through lines 94, 108 and 116 are integrated into a single output signal which is converted to a DC output signal and supplied through line 84 to actuate the coil of the control valve 44. Thus, after a balance has been produced in the impedance bridge, any changes in any of input signals will cause a current to be present in the voice coil and the valve element will be moved.

Of course, the amplification and demodulation of the transformer signals could be accomplished by incorporating an amplifier and demodulator within the variable transformers.

OPERATION

The operation of the draft control mecahnism will be apparent from the above description. Thus, the draft control mechanism is originally adjusted by positioning the manual control lever 80 to a position corresponding to the desired position of the implement on the tractor. This repositioning of the manual control lever 80 will move the core 112 within the variable transformer 110 to thereby produce an electrical signal through line 116. This signal disturbs the balance within the bridge in control circuit 96 to produce an output signal 84 thereby actuating the valve 44 to supply fluid through conduit 40 to the actuator 30.

This condition will continue until the rockshaft 20 reaches a position corresponding to the position set by the manual control lever The movement of the rockshaft of course producing an electrical signal through line 108 which is also operatively connected to the bridge within the control circuit 96. Once a balance has been reached in the control circuit 96 the voltage output through line 84 will move the control valve to the neutral position.

After this positional setting has been accomplished, any changes in the position of the draft arms 26 will cause a corresponding change in the rotational position of the rock-shaft 20 thereby producing a signal through line 108 which disturbs the balance of the bridge in the control circuit 96 to again produce an output signal and actuate the control valve.

As was indicated above, the present control mechanism also is capable of maintaining a predetermined draft load on the implement. For this purpose, the sensing mechanism 60 is adjusted so as to be insensitive to any draft load below a predetermined normal draft load desired on the draft arms. If the draft load on the draft arms rises above the predetermined level, the follower rod or feedback member 72 will be moved vertically to thereby move the core 92 within the variable transformer 90 thus producing an electrical signal through line 94 again disturbing the balance of the bridge within control circuit 96. This again actuates the valve in the manner described above and the valve element will continue to move until the signal from the variable transformer 100 balances the signal from the variable transformer 90 whereupon the valve element will return to the neutral position.

It will be appreciated that the signals produced by the respective transformers will at times correspond to the condition of the respective elements connected thereto. Thus, a first position setting of the sensing mechanism will produce a signal which must be balanced within the bridge by another signal, such as the signal associated with the rockshaft, to allow the valve to be moved to a neutral position.

It is readily apparent that the invention provides a simple and efficient manner of maintaining a predetermined draft load and/or position between an implement hitch and a tractor. This is accomplished without the necessary of any complicated and expensive intricate interconnected control mechanisms which has heretofore been required by control systems of this type.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims:

I claim:

1. In a vehicle having a hitch linkage, power actuated means for raising, lowering and supporting the linkage including hydraulic motor means, electrically operated valve means selectively actuating said motor means to raise and lower said linkage, and sensing means responsive to the draft on said hitch linkage, the improvement of said sensing means comprising mechanical means responsive to changes in draft on said hitch linkage circuit means for operating said electrically operated valve means, said circuit means including variable transformer means operatively connected to said mechanical means so as to produce a signal which is a function of the magnitude and speed of changes in said draft for actuating said valve means to raise or lower the linkage.

2. A vehicle as defined in claim 1 wherein said power actuated means includes manual control means for selecting a position for said linkage, wherein the circuit means further includes second variable transformer operatively connected to said control means so as to produce a second signal which is a function of the position of said control means, said circuit means being operative to compare said signals so as to cause said valve means to be actuated in accordance with the compared difference between said signals.

3. A vehicle as defined in claim 2, wherein said circuit means further includes third variable transformer means operatively connected to the motor means so as to produce a third signal for indicating the position of said motor means and said circuit means compares all of said signals and causes said valve means to be actuated in accordance with the compared difference between all of said signals.

4. A control system for a tractor drawn implement having hydraulic motor means rotating a rockshaft operable to raise and lower the implement, electrically operated valve means for controlling said motor means and having a valve member movable in opposite directions from a neutral position to raise and lower the implement, and sensing means operatively connected to the implement for sensing changes in draft load on the implement, comprising circuit means for operating said electrically operated valve means, said circuit means including first variable transformer means operatively connected to said sensing means for producing a first signal which is a function of the changes in draft load on the implement, second variable transformer means operatively connected to said rockshaft for producing a second signal which indicates the position of said rockshaft, said circuit being operative to compare said signals so as to develop a difference signal for supply to said valve means for actuating said valve member.

5. A control system as defined in claim 4, wherein said tractor further includes a manual control for setting the position of said implement of the tractor, the further improvement wherein said circuit means also includes third variable transformer means operatively connected to said manual control for producing a third signal as a function of the setting of manual control and said circuit means compares all of said signals and causes said valve means to be actuated in accordance with the compared difference between said all of said signals.

6. A control system as defined in claim 4, in which said first signal is a function of the rate and amount of changes in draft load on the implement.

7. In a control system for a valve having a valve element movable in opposite directions from a neutral position for actuating hydraulic motor means operable to rotate a rockshaft on a vehicle for raising and lowering a hitch linkage supported on the vehicle, said system including a manual member for setting the position of the hitch linkage, a sensing member operatively connected to said hitch linkage and responsive to changes in draft on said linkage, the improvement of circuit means for operating said valve, said circuit means including first variable transformer means operatively connected to said manual member for producing a first signal responsive to a setting of said manual member, second variable transformer means operatively connected to said linkage producing a second signal responsive to the position of said linkage, third variable transformer means operatively connected to said sensing member for producing a third signal which is a function of the rate and amount of the changes sensed by said sensing member, the circuit means being operative to compare said signals to produce a difference signal and control means operative in response to said difference signal for actuating said valve whereby said hydraulic motor means will position said linkage to correspond to the setting of said manual member and maintain said linkage in a draft position corresponding to a predetermined normal draft load on said linkage.

8. A method of controlling the magnitude of draft exerted upon a hitch pivotally supported on a tractor, comprising producing a first signal which corresponds to the desired magnitude of draft on the hitch, producing a second signal corresponding to the pivotal position of said hitch on the tractor, comparing said signals and producing a single output signal as a function of said first and second signals, varying said first signal as a function of the rate and amount or changes in draft on the hitch, and varying said second signal in response to changes in draft and position of the hitch, and repositioning said hitch in response to said changes.

9. A method as defined in claim 8, including the further step of producing a third signal as a function of the desired pivotal position of said hitch on the tractor, comparing said third signal with said first and second signals whereby said output signal is a function of said first, second and third signals.

References Cited

UNITED STATES PATENTS

| 2,730,029 | 1/1956 | Brundage | 172—7 |
| 2,775,175 | 12/1956 | Du Shane | 172—12 |
| 2,998,851 | 9/1961 | Marindin | 172—9 |
| 3,098,528 | 7/1963 | Richey et al. | 172—7 |
| 3,147,622 | 9/1964 | Weir | 73—141 X |
| 3,158,945 | 12/1964 | Curlett et al. | 172—4.5 |
| 3,190,123 | 6/1965 | Schmitt | 73—398 |
| 3,229,391 | 1/1966 | Breitbarth et al. | 172—4.5 |
| 3,246,701 | 4/1966 | Schulz | 172—9 |
| 3,374,842 | 3/1968 | Smith | 172—7 |

FOREIGN PATENTS 510,443 9/1920 France.

ROBERT E. PULFREY, Primary Examiner

A. E. KOPECKI, Assistant Examiner